United States Patent [19]

Wasserman et al.

[11] 4,053,680

[45] Oct. 11, 1977

[54] PROCESS FOR BONDING POLYMERS

[75] Inventors: Bernard Wasserman, Ridgecrest; Martin H. Kaufman, China Lake, both of Calif.

[73] Assignee: The United States of America as represented by the Secretary of the Navy, Washington, D.C.

[21] Appl. No.: 637,507

[22] Filed: Dec. 4, 1975

[51] Int. Cl.$^2$ .......................................... B32B 27/40
[52] U.S. Cl. ...................... 428/423; 102/103; 156/306; 156/329; 427/385 B; 427/407 C; 427/400; 428/420; 428/447
[58] Field of Search .............. 156/306, 307, 308, 309, 156/314, 315, 326, 327, 334, 294, 329; 427/301, 302, 333, 337, 340, 385 B, 387, 399, 400, 407 R, 407 C, 444; 428/420, 451, 447, 423, 521; 260/827, 46.5 H, 46.5 G; 102/103; 60/253, 39.47, 255; 264/3 R; 86/1 R

[56] References Cited

U.S. PATENT DOCUMENTS

| | | | |
|---|---|---|---|
| 2,751,314 | 6/1956 | Keil ........................................ | 428/450 |
| 3,053,712 | 9/1962 | Grabowski ............................ | 156/308 |
| 3,198,692 | 8/1965 | Bridgeford ............................ | 428/420 |
| 3,313,773 | 4/1967 | Lamoreaux ........................ | 260/375 B |
| 3,433,158 | 3/1969 | Pierce .................................... | 102/103 |
| 3,477,869 | 11/1969 | Butler et al. ........................ | 428/447 |
| 3,507,114 | 4/1970 | Webb .................................... | 102/103 |
| 3,607,832 | 9/1971 | Hansen .............................. | 260/375 B |
| 3,686,355 | 8/1972 | Gaines et al. ........................ | 156/306 |
| 3,716,604 | 2/1973 | Dehm .................................... | 102/103 |
| 3,725,174 | 4/1973 | Gaylord ................................ | 156/308 |

*Primary Examiner* — Charles E. Van Horn
*Assistant Examiner* — J. J. Gallagher
*Attorney, Agent, or Firm* — R. S. Sciascia; Roy Miller

[57] ABSTRACT

A material which has two reactive groups, one of which is reactive with the first of two dissimilar polymeric materials but not the second and the other of which is reactive with the second but not the first, is utilized to bind layers of the two polymeric materials together. The groups that are reactive with the first polymeric material are reacted with it as a layer of that material cures. Then a layer of the uncured second polymeric material is placed on the first and the groups that are reactive with it are reacted with it as it cures.

2 Claims, No Drawings

PROCESS FOR BONDING POLYMERS

BACKGROUND OF THE INVENTION

1. Field of the Invention

This invention relates to the chemical tieing of two layers of dissimilar polymeric material to each other.

2. Description of the Prior Art

It is well known, especially in the field of rocketry, that it is often desirable to bond two layers of dissimilar polymeric material together and that is it often difficult to obtain tight bonds between two dissimilar materials. For example, Paul H. Skidmore mentions this problem in U.S. Pat. No. 3,813,308 in connection with the bonding of a carboxy-containing rubber liner to an insulator in a rocket motor. Skidmore solves his problem by applying a coat of polyisocyanate to the rubber insulator (by treating the insulator with a solution of the polyisocyanate and allowing the solvent to evaporate), then applying a layer of uncured carboxy-containing rubber liner material to the polyisocyanate coated surface and finally, curing the liner material. As the layer of carboxy-containing rubber liner material cures, its carboxy groups apparently react with the isocyanate groups of the polyisocyanate and a strong bond is formed. However, this method has a drawback in that a strong bond between the polyisocyanate coating and the rubber insulator is lacking.

Difficulties in bonding dissimilar polymeric material together arise because of differences in surface energies. For example, if atoms from the two polymeric layers cannot get close to each other (perhaps because of large size disparities), van der Waals forces cannot be taken advantage of. Nor can hydrogen bonding be taken advantage of.

SUMMARY OF THE INVENTION

According to this invention, two dissimilar polymeric materials are chemically tied together by means of a material having two reactive groups. One of the reactive groups is chosen to be compatible with and reactive with one of the two polymeric materials but not the other and the second of the reactive groups is chosen to be compatible with and reactive with the second polymeric material but not the first. A suitable amount of the material with the two reactive groups is combined with one of the polymeric materials while the polymeric material is in a curable prepolymer state, a soft polymer state or a molten polymer state. Then a layer of the combined materials is laid down and the polymeric material is cured. After this, a layer of the second polymeric material is deposited on the first while the second is in the state of being a molten polymer, soft polymer or curable prepolymer composition. Finally, the second layer is cured. As the first polymeric material is cured, those reactive groups of the binding material that are reactive with it react with it and those that are not do not. Since those groups that are not reactive with the first polymeric material are also chosen so as to be incompatible with it, the ends of the binder molecules containing those groups tend to migrate to the surface as the first polymer layer is cured. This leaves them available at the surface for reaction with the layer of dissimilar polymer when it is applied.

DESCRIPTION OF THE PREFERRED EMBODIMENTS

This invention may be conveniently illustrated by means of specific examples.

EXAMPLE 1

0.062 Weight percent of undecylenyl alcohol, a material having the formula $CH_2=CH-(CH_2)_8-CH_2-OH$ and 99.938 weight percent uncured silicone rubber prepolymer were mixed, a layer of the mixture was laid down and the prepolymer was cured to silicone rubber by conventional methods. Next, a propellant whose binder was a mixture of hydroxy terminated polybutadiene prepolymer and isophorone diisocyanate containing a ratio of isocyanate equivalents to hydroxy equivalents of 0.80 was prepared, laid down in a layer on the silicone rubber layer and allowed to cure. Tests showed that a force of 47 psi was required to pull the two layers apart. A similarly prepared blank which contained no undecylenyl alcohol separated when 22 psi of force was applied.

EXAMPLE 2

A mixture of 1.5 weight percent hydroxy terminated polybutadiene prepolymer (Arco R-45M) and 98.5 weight percent silicon prepolymer, laid down in a layer and allowed to cured. A propellant whose binder was a mixture of hydroxy terminated polybutadiene prepolymer and isophorone diisocyanate containing a ratio of isocyanate equivalents to hydroxy equivalents of 0.74 was then prepared, laid down in a layer on the silicon layer and allowed to cure. The two layers separated under a force of 73 psi as compared to 13 psi for a blank which had had no hydroxy terminated polybutadiene mixed into the silicon rubber layer.

In both of the foregoing examples, it would appear that vinyl groups, in the first case from the undecylenyl alcohol and in the second case from the hydroxy terminated polybutadiene prepolymer that is mixed into the silicon prepolymer react with the silane groups as the silicone layer cures. Similarly, in both of the foregoing examples it would appear that hydroxy groups from the additive (undecylenyl alcohol or hydroxy terminated polybutadiene prepolymer) react with isocyanate groups in the propellant. Thus molecules of the additive may be said to act like strings tieing the two layers together and the sites at which reactions take place (vinyl with silane and hydroxy with isocyanate) may be said to act like knots.

The reaction of vinyl groups with silane groups may be illustrated by:

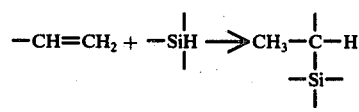

The reaction of hydroxy groups with isocyanate groups may, of course, be illustrated by:

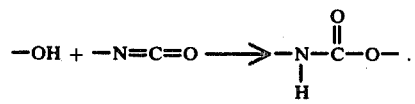

EXAMPLE 3

Further experiments similar to those described in Examples 1 and 2 illustrated that from 0.05 weight percent to 0.25 weight percent undecylenyl alcohol could be utilized with from 99.95 weight percent to 99.75 weight percent silicone prepolymer with similar excellent results and that when hydroxy terminated polybutadiene prepolymer was used as the additive it could be used in amounts ranging from 0.5 weight percent to 2.0 weight percent. The ratio of isocyanate equivalents to hydroxy equivalents in the propellant was varied from 0.68 to 0.80 with no deleterious effect and can undoubtedly be varied more.

The foregoing examples deal specifically with chemically tieing a silicone rubber layer to a propellant with an isocyanate cured hydroxy terminated polybutadiene binder. It will be obvious to those skilled in the art that the procedures of the foregoing examples would be suitable for use in a rocket motor where it was desirable to bind a silicone rubber insulator to hydroxy terminated polybutadiene bound solid propellant grain. It will also become apparent that, in any situation where it is desirable to bind two layers of dissimilar polymeric materials together, one can do so merely by choosing the proper additive, i.e., an additive with two reactive groups per molecule, one of which is reactive with one of the two polymeric materials but not the second and the other of which is reactive with the second polymeric material but not the first.

In the foregoing examples the additive was reacted with both of the materials that were to be bound together while the materials were in a prepolymer state. The invention should not be construed as being so limited. "Knot" can also readily be formed by reacting the "strings" with the materials that they are to bind together when the materials are in either a soft polymer state or a molten polymer state.

When either undecylenyl alcohol or hydroxy terminated polybutadiene prepolymer is used with silicone prepolymer, the ends of the "strings" that contain the hydroxy groups appear to tend to migrate to the surface while the ends that contain the vinyl groups react with silane groups. That is, of course, advantageous in that when the "Knots" formed by reaction of vinyl groups with silane groups have been formed and the silicone layer has been cured, most of the hydroxy groups are available, at the surface, for reaction with the isocyanate curative of the hydroxy terminated polybutadiene layer when it is applied.

What is claimed is:

1. An article of manufacture comprising at least two layers, one of which is a silicon rubber layer and the second of which is a layer containing isocyanate cured hydroxy terminated polybutadiene, the layers being chemically tied together by chemical strings, the strings being chemically knotted in the silicone rubber layer by

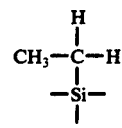

groups and in the isocyanate cured hydroxy terminated polybutadiene layer by

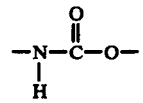

groups.

2. A method for chemically tieing a layer of silicone rubber to a layer of material containing isocyanate groups, said method comprising the steps of:
   1. forming a mixture by mixing uncured silicone rubber prepolymer which contains silane groups with a material containing vinyl groups which are compatible with and reactive with the silane groups and hydroxy groups which are incompatible with the prepolymer and forming said mixture into a layer;
   2. curing the prepolymer to form silicone rubber whereby the vinyl groups react with the silane groups and the hydroxy groups migrate to the surface of the layer;
   3. applying a layer of the material which contains isocyanate groups to the surface of the silicone rubber; and
   4. allowing isocyanate groups to react with the hydroxy groups whereby the layers become chemically tied together by chemical strings, the strings being chemically knotted in the silicone rubber layer by $CH_3-CH_2-Si\equiv$ groups and in the layer which contained isocyanate groups by

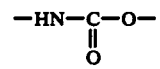

groups.